United States Patent [19]

DuPont et al.

[11] Patent Number: 5,484,506
[45] Date of Patent: Jan. 16, 1996

[54] SMOOTH BORE WELDING OF THERMOPLASTIC TUBING

[75] Inventors: Paul R. DuPont, Andover; Richard B. Schwarz, Lincoln Park; Richard N. Dubord; Michael L. Simone, both of Hackettstown, all of N.J.

[73] Assignee: Sani-Tech Incorporated, Lafayette, N.J.

[21] Appl. No.: 242,722

[22] Filed: May 16, 1994

[51] Int. Cl.$^6$ .................................................. B29C 65/02
[52] U.S. Cl. .......................... 156/503; 156/544; 156/158; 156/304.2; 219/535
[58] Field of Search ...................................... 156/503, 544, 156/158, 304.2, 502, 581, 583.1, 583.3, 583.9, 583.91; 219/535, 243, 524

[56] References Cited

U.S. PATENT DOCUMENTS

| | | |
|---|---|---|
| 3,004,328 | 10/1961 | Pepper . |
| 3,022,209 | 2/1962 | Campbell . |
| 3,030,246 | 4/1962 | Westlake . |
| 3,276,941 | 10/1966 | Burns . |
| 3,284,613 | 11/1966 | Gettelman et al. ...................... 219/535 |
| 3,666,586 | 5/1972 | Lacey . |
| 4,075,268 | 2/1978 | Nolan . |
| 4,288,266 | 9/1981 | Konrad . |
| 4,398,879 | 8/1983 | DuPont et al. .......................... 425/392 |
| 4,792,374 | 12/1988 | Rianda . |
| 5,013,376 | 5/1991 | McElroy, II et al. .................... 156/503 |
| 5,037,500 | 8/1991 | Hilpert ..................................... 156/503 |

FOREIGN PATENT DOCUMENTS

| | | |
|---|---|---|
| 0020915 | 1/1981 | European Pat. Off. . |
| 8002124 | 10/1980 | WIPO . |

OTHER PUBLICATIONS

George Fisher "SYGEF HP BCF—The PVDF piping system with the bead & crevice free fusion jointing for ultrapure media" (manufacturer brochure date unknown Nov. 1991 or 1989?).

Primary Examiner—Michael W. Ball
Assistant Examiner—Sam Chuan Yao
Attorney, Agent, or Firm—Howard R. Popper

[57] ABSTRACT

A hand-holdable, portable welding apparatus for smoothly joining the lumens of sections of thermoplastic tubing systems, including those that may be located in a cramped work site. The integrity of the lumens is maintained when the tubes are being welded by use of a selectively rigidizable, non-elastomeric mandrel of PTFE or PFA having a predetermined maximum size dimensioned to the ID of the lumens being joined. The welding unit employs a resiliently mounted coaxial heater block in conjunction with arcuate radiator inserts that are centered about the tubes to be welded regardless of the diameter of the tubes. Spring-loaded dogs grab the periphery of the tubes as they are inserted into the welding unit and prevent them from moving apart when heat is applied.

13 Claims, 6 Drawing Sheets

5,484,506

SMOOTH BORE WELDING OF THERMOPLASTIC TUBING

FIELD OF THE INVENTION

This invention relates to high purity systems requiring tubing and fittings having a smooth and crevice-free inner bore and, more particularly, to portable apparatus for welding together thermoplastic sections of such systems at a job site.

BACKGROUND OF THE PRIOR ART

The advent of apparatus for adapting plastic tubing to the standard type of quick-connect sanitary fittings first made available in stainless steel has spurred the growth and popularity of high purity plastic tubing systems. For accommodating rigid tubing to such fittings, U.S. Pat. No. 4,398,879 discloses apparatus for reforming the end of a length of rigid plastic tubing so that the tubing can be adapted in the field to make up with the appropriate standard size of quick-connect sanitary flange fitting. For accommodating flexible hoses to such fittings, patent application Ser. No. 07/915,297 filed Jul. 20, 1992 entitled "Quick-Connect Sanitary Hose Fitting" discloses apparatus for attaching a flexible flange seal to the end of flexible sanitary hose which can be clamped to a stainless steel flange fitting. Another type of fitting for sanitary hoses is shown in U.S. Pat. No. 5,176,411 which discloses a reusable type of sanitary hose coupling. While the availability of suitable couplings for sanitary tubing systems has increased the applicability of such systems, there are applications where a permanent connection of the elements employed in such systems may be required and often the need for making such a permanent connection arises in the field. While ordinary plumbing systems may have their joints cemented together, sanitary systems require that all lumens be smooth and crevice-free. A number of machines have long been known for butt welding thermoplastic pipe sections in a factory setting, such as U.S. Pat. No. 3,022,209 issued Feb. 20, 1962 to Campbell; U.S. Pat. No. 3,276,941 issued Oct. 4, 1966 to Burns; and U.S. Pat. No. 4,075,268 issued Feb. 21, 1978 to Nolan. Heretofore there has been no way conveniently to effect a permanent connection of sanitary tubing elements in the field. In addition, where the work space at the job site is cramped, such as in underground piping systems accessible only through a manhole or in elevated piping systems supported on utility trays, apparatus suitable for use in a factory setting may be too bulky and unwieldy for use at a work site. Additionally, it may be necessary to butt weld variety of different sizes of tubing requiring different temperatures and welding times. Accordingly, a portable apparatus capable of satisfying these desiderata would be a useful tool.

In effecting a butt weld of thermoplastic pipe or tubing it has long been appreciated that a mandrel may be used to maintain the pipe lumen in a clear and smooth condition when the pipe is heated during the welding operation. Examples are shown in U.S. Pat. No. 3,666,586 issued May 30, 1972 to Lacey; U.S. Pat. No. 4,288,266 issued Sep. 8, 1981 to Konrad et al; and U.S. Pat. No. 4,792,374 issued Dec. 20, 1988 to Rianda. The latter patent discloses the use of a pressurizeable bladder made of an elastomeric material such as a silicone or fluorosilicone rubber which is inserted in the bores of the pipe ends to prevent internal beading during the welding operation. However, the use of an elastomeric bladder in contact with the lumen of the heated plastic pipes requires that the air pressure be closely controlled so that the inflated bladder is not over-expanded to distort the pipe lumen and force the heated plastic material to be expressed or flashover at the joint. In addition, the use of an elastomeric bladder that is in intimate contact with the pipe lumen may tend to bind or stick to the walls of the pipes being welded together causing some degree of scarring of the lumen. Maintenance of the smoothness and integrity of the heated pipe lumen becomes even more problematical as the elastomeric material of the bladder tends to retain a set with repeated usage.

SUMMARY OF THE INVENTION

We have devised a portable welding apparatus for smoothly joining the lumens of sections of thermoplastic tubing systems, including those that may be located in a cramped work site. The portable welding apparatus of our invention employs an inflatable but non-elastomeric mandrel made of heat-resistant, non-stick material such as PTFE (polytetrafluoroethylene), "TEFLON" or PFA manufactured by E. I. DuPont de Nemours, Inc. The mandrel of our invention is thus merely rigidized rather than being stretched by the inflating air pressure, its fixed and unchanging OD being chosen to match the lumen size of the plastic tubing to be welded. The apparatus employs a resiliently mounted heater block that can accommodate arcuate radiator inserts to coaxially embrace the outside diameter of various size thermoplastic tubes to be welded. The proper positioning of the tubing ends within the radiator unit is facilitated by pairs of spring-loaded tubing retainer dogs or latches that are activated to firmly clutch the tubing ends as they are inserted into the welding unit. Application of a heating and curing cycle appropriate both to the thermoplastic material being welded and the ambient conditions of the work site is controlled by a computerized unit which monitors the heater block temperature and delays the start of the cycle until the appropriate baseline temperature is reached. Further, the rigidization of the mandrel by application of compressed air after the mandrel is inserted into the tubing lumen is reversed at the end of the heating cycle by pumping down of the mandrel to partially collapse it and facilitate its being withdrawn from the tubing lumen.

DESCRIPTION OF THE DRAWING

The foregoing features are illustrated in the accompanying drawing, in which.

DETAILED DESCRIPTION

Figure 1:
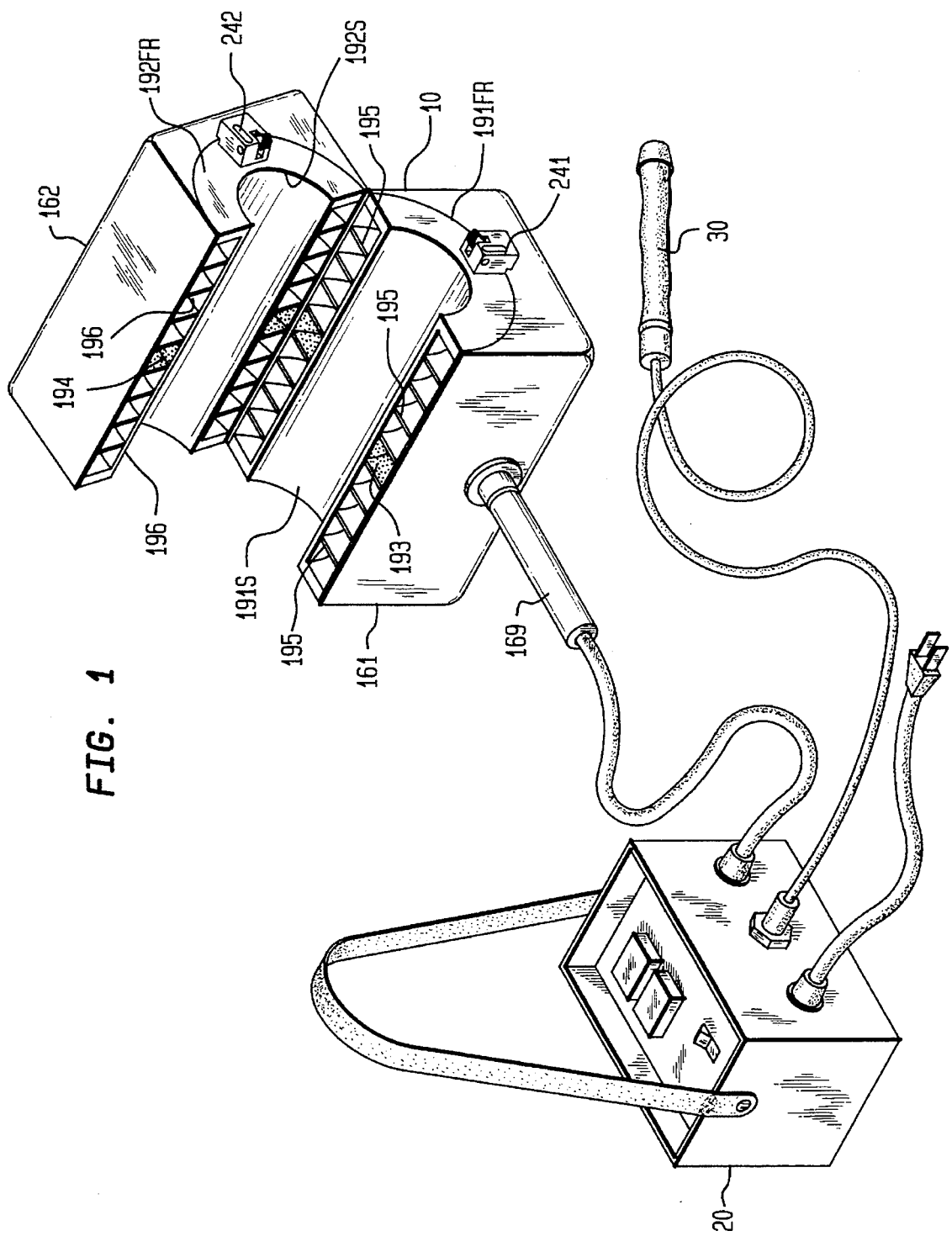
FIG. 1 shows the portable system comprising the hand-holdable welding unit, the control and compressor unit and the inflatable mandrel.

Referring now to FIG. 1 there is shown the hand-holdable welding unit 10 of our invention, together with the control unit 20 and inflatable mandrel 30. Control unit 20 includes instrumentation for measuring the temperature within the welding unit and circuitry for timing the delivery of current to the heaters and fan of the welding unit, a compressor (not shown) and a vacuum pump (not shown) attached to hose 809. The vacuum pump may advantageously be engaged to collapse the mandrel so that it may more easily be snaked through the tubing lumen before and after the compressor is engaged to rigidize the mandrel during the actual welding operation.

Welding unit 10 comprises an upper cover 162 and a lower compartment 161. The cover 162 is shown in the open position. Cover 162 houses upper radiator sector 192 (see FIG. 2) having a concave surface 192S for conforming to the outside diameter of one half of the pipe sections to be joined while the lower compartment 161 contains lower radiator sector 191 having the corresponding concave surface 191S. Upper radiator sector 192 includes fins 196 disposed at either side of central core portion 194. Lower radiator sector 191 includes fins 195 disposed at either side of central core portion 193.

Figure 9:
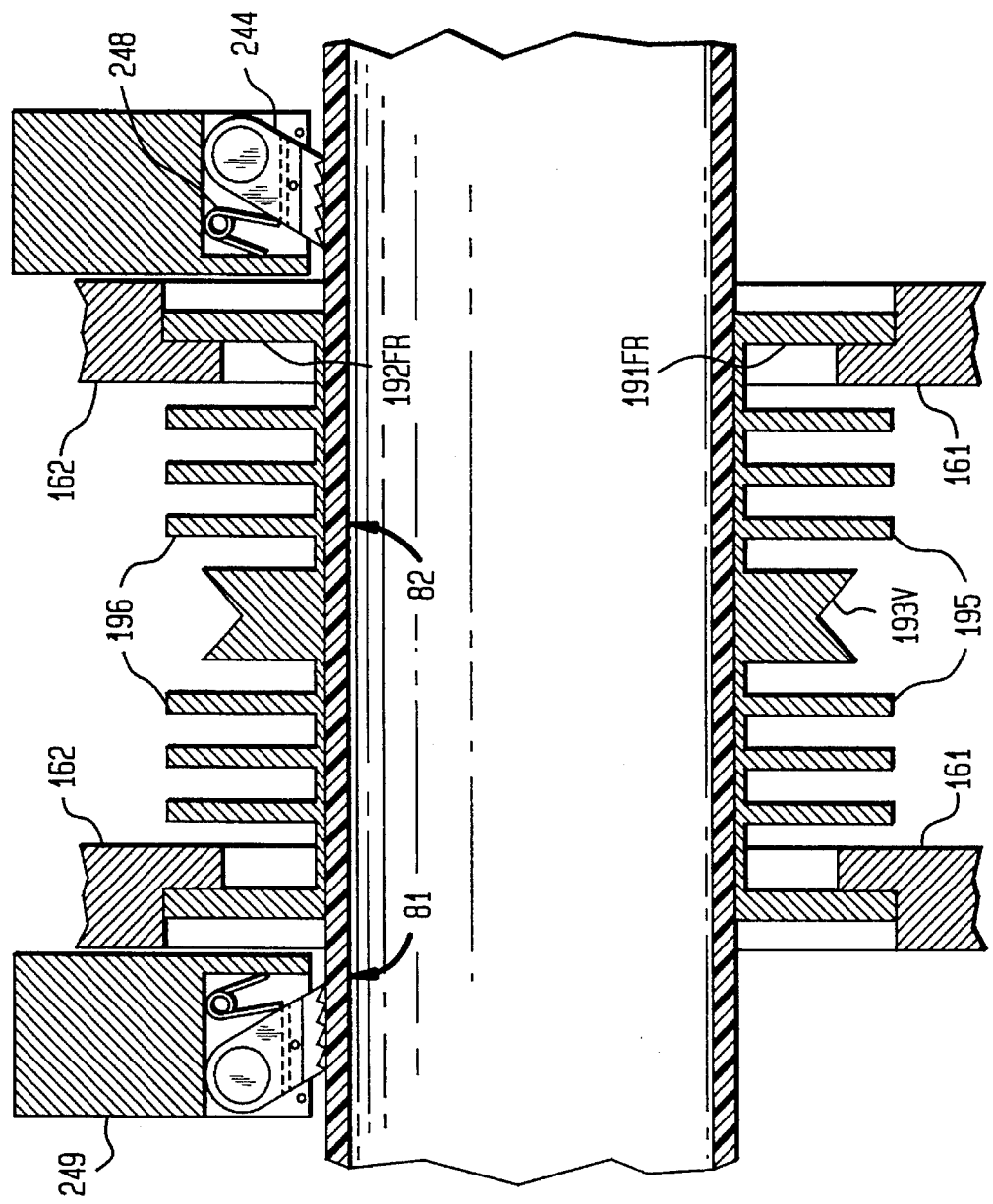
FIG. 9 is a section through the welding unit compartments showing the tubing retainer latches.

Attached to the outside right-hand flange 192FR of the upper radiator sector 192S is spring-loaded dog latch 242 and attached to the outside right-hand flange 191FR of the lower radiator sector is spring-loaded dog latch 241. When cover 162 is closed, latches 242, 241 cooperate to retain between them, and within the welding unit, an end of one of the sections of tubing (not shown in FIG. 1), to be welded. A similar pair of latches, of which latch 249 is shown in FIG. 9, are provided at the lefthand side of unit 10 to retain the other tubing end.

Figure 2:
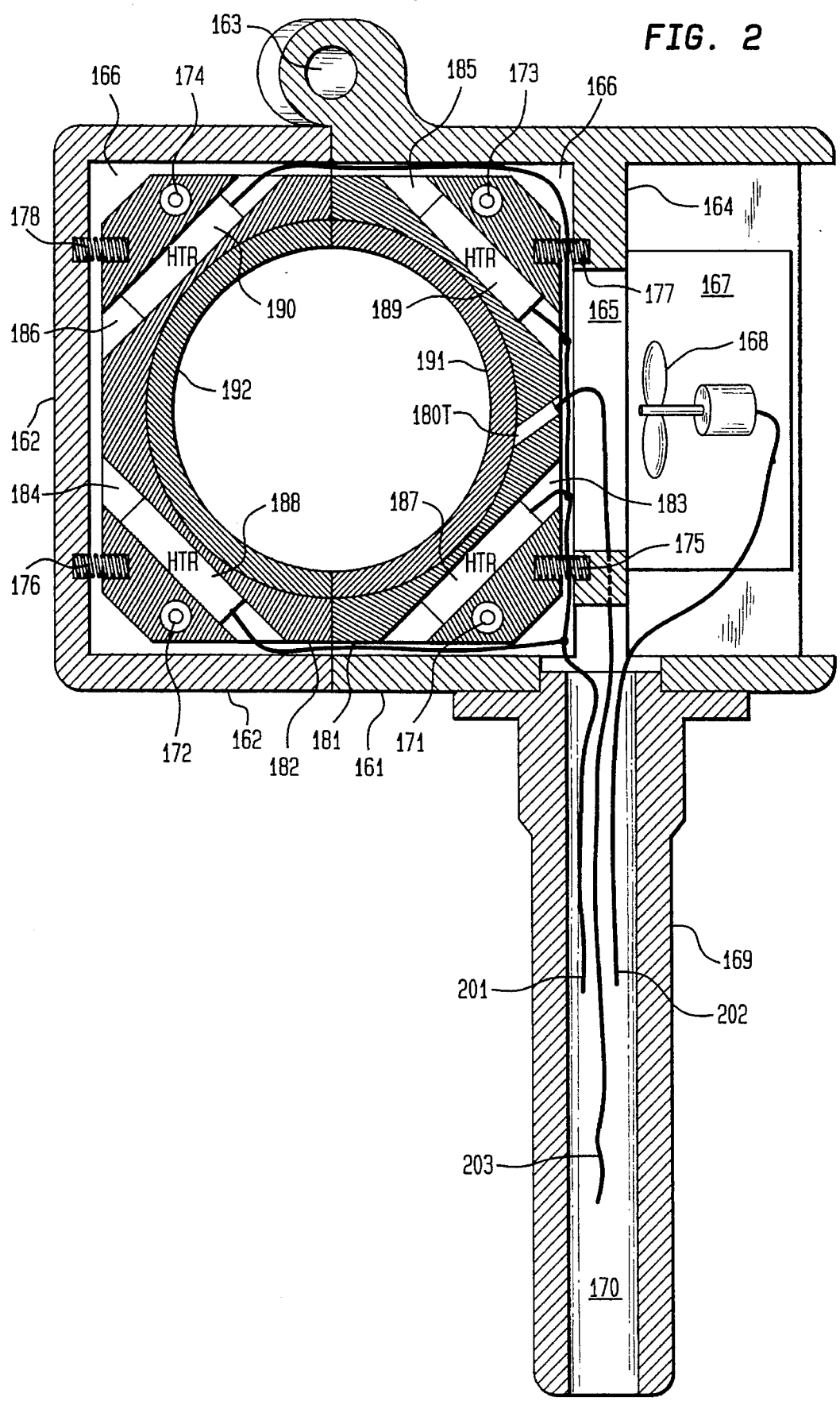
FIG. 2 shows a section through the welding unit.

FIG. 2 is a section taken through welding unit 10 in the closed position. The main body of the welding unit comprises a lower compartment 161 and an upper or cover compartment 162 which are hingeably connected together at pin 163. Lower compartment 161 is partitioned by ventilation web 164 into a forming chamber 166 and a well 167 in which cooling fan 168 is mounted. Fan 168 draws ambient air through apertures (not shown) in upper cover 162 into forming chamber 166. The cooling air flows around the fins 196, 195 (not shown in FIG. 2, but see FIGS. 1 and 4) of the upper and lower radiator sectors 192, 191 and through aperture 165, where it is exhausted by fan 168. A handle 169 is fastened to lower compartment 161 and includes a passage 170 through which pass electric cables 201 for the four heater cartridges 187, 188, 189, 190, cable 202 for fan 168 and cable 203 for thermocouple 180T (not shown in FIG. 2, but see FIG. 5).

Located within lower compartment 161 and resiliently supported on rods 171, 173 and springs 175, 177 is lower heater block 181 while located within upper cover 162 and resiliently supported on rods 172, 174 and springs 176, 178 is upper heater block 182. Lower heater block 181 contains passages 183, 185 for respective electrical heater cartridges 187, 189 while upper heater block 182 contains passages 184, 186 for respective electrical heater cartridges 188, 190.

Figure 4:
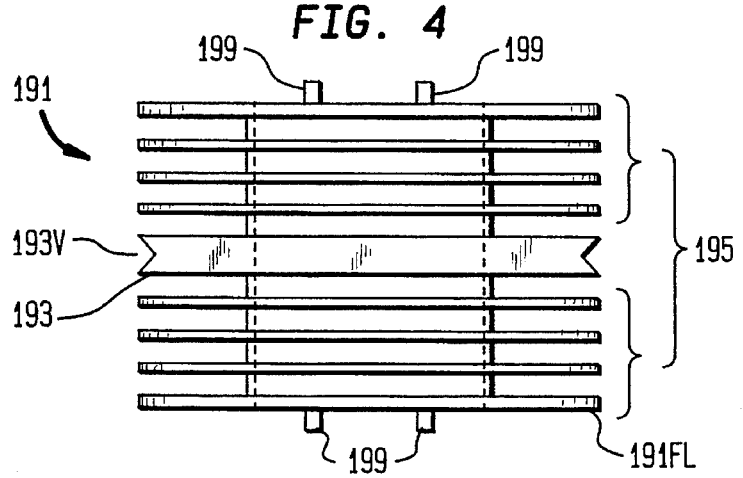
Figure 5:
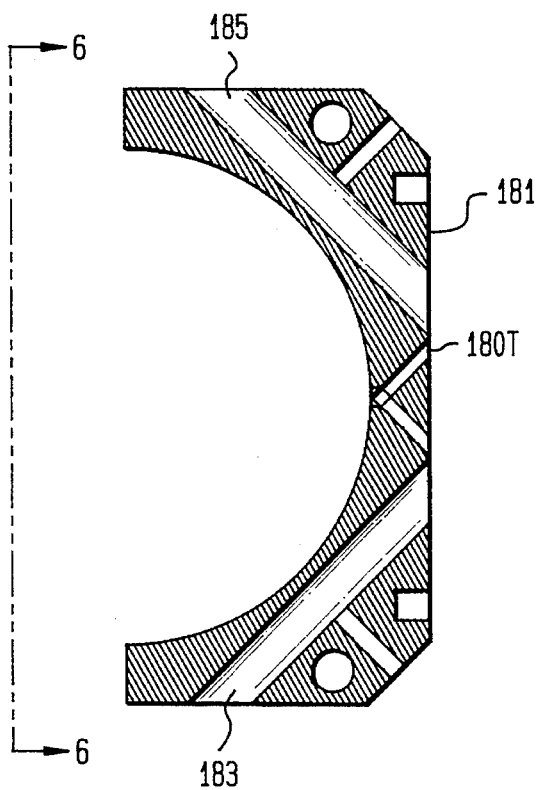
FIGS. 5 and 6 show a sectional and edge view of one half of the heater block of the welding unit.
Figure 6:
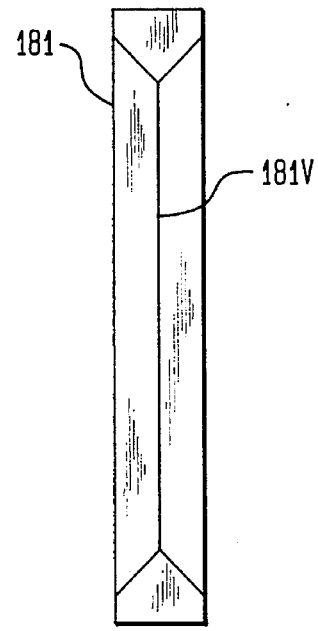

The concave surface of lower heater block 181, shown separately in FIGS. 5 and 6, has a V-shaped, male profile 181V for retaining and intimately conforming in heat transfer relationship to the V-shaped, female profile 193V of the central core portion 193 of lower radiator sector 191. Maximum thermal transfer the V-shaped surfaces are advantageously kept free of any anodizing or other coating that may be applied to the other exposed surfaces of the radiator sectors. End and underside views of lower radiator sector 191 are shown respectively in FIGS. 3 and 4. The 11 concave surface 191S of lower radiator sector 191 and the concave surface 192S of upper radiator sector 192, when cover 162 is closed together, match the outer periphery of the cylindrical tubing sections (not shown, but see FIG. 8), that are placed in unit 10 to be welded. Different size 16 tubing sections require radiator sectors having different diameter concave surfaces 191S, 192S. It is a feature of the present invention that pairs of these different size radiator sectors may be interchangeably accommodated by the resiliently mounted central heater blocks 181, 182 so that regardless of the diameter of the pair of plastic tubes to be joined, the parting line of the arcuate radiator sectors will be substantially flush with the hinged joint between the cover 162 and the lower compartment 161.

Laterally disposed to either side of central core portion 193 of lower radiator sector 191, as shown in FIG. 4, are a plurality of radiation fins 195. The concave surface of upper heater block 182 includes a similar V-shaped male profile (not explicitly shown) for retaining a corresponding V-shaped female portion (not explicitly shown) of upper radiator sector 192.

Figure 3:
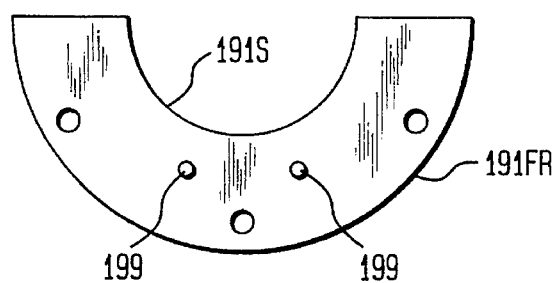
FIGS. 3 and 4 show end and top views of the lower half of one of the radiator sectors of the welding unit for accommodating a particular size of thermoplastic tubing.

FIG. 3 shows the right-hand flange 191FR of lower radiator sector 191 which contains locating pins 199 for positioning spring-loaded dog latch 241 (FIGS. 1 and 7) to accommodate different diameter tubing to be welded.

Figure 7:
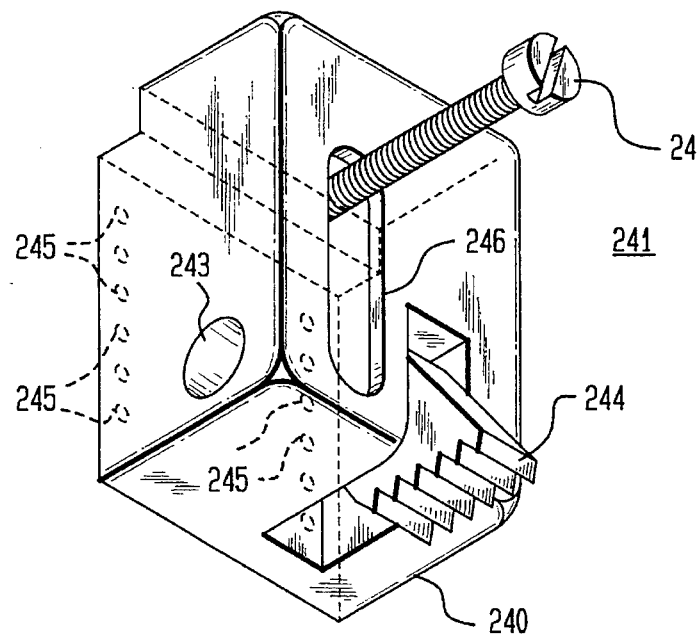
FIG. 7 shows one of the tubing retainer latches.

Referring to FIG. 7, there is shown an isometric view of one of the tubing latches 241, a pair of which, as shown in FIG. 1, is affixed at each end of welding unit 10. Latch 241 includes a mounting block 240 having a plurality of pairs of pin holes 245 on its rear surface for receiving pins 199 (see FIGS. 3 and 4) to correctly locate the mounting block on its respective flange 191FR (FIG. 1) for each different size radiator sector 191. Block 240 is affixed to its respective flange by screw 24. The mounting of block 240 on different pairs of pins 199 is facilitated by elongated screw slot 246. Claw 244 is mounted on hinge pin 243 and urged by spring 248, FIG. 9, so that claw 244 engages the outer periphery of one of the plastic tubing ends such as 82, FIG. 8, as tubing end 82 is inserted into welding unit 10, preventing the tubing ends from moving apart when heat is applied.

Figure 8:
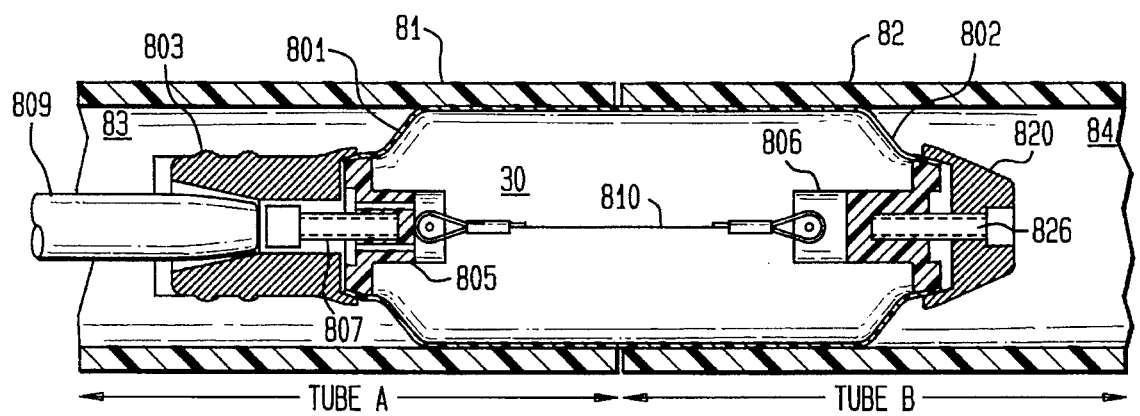
FIG. 8 shows a section through the tubing ends with the preferred embodiment of rigidizable mandrel positioned within the tubing lumens.

Referring to FIG. 8 there is shown a preferred embodiment of a rigidizable mandrel 30 positioned inside the lumens 83, 84 at the butt ends 81, 82 respective to tubes A and B. Mandrel 30 comprises a flexible but non-elastic sleeve 801 made of a material such as PFA or PTFE, an air hose end-cap 803 and a pilot end-cap 820. Sleeve 801 is secured to end-caps 803 and 820 by means of tapered carrots 805 and 806 and screws 807, 826. Link 810 loosely and flexibly connects together carrots 805 and 806. It should be understood that the remote ends (not shown) of tubes A and B may be at any distance away from butt ends 81, 82 and mandrel 30 may therefore have to be snaked through intervening bend or elbows to arrive at the butt ends 81, 82. Link 810 facilitates mandrel 30 being threaded though the tubing lumens.

The major diameter of sleeve 801 is fixed and chosen to substantially match the diameter of the lumen 83 of the tubes A and B that are to be welded together. Illustratively, where the tubing lumen is 1.5" in diameter, the outside diameter of sleeve 801 is chosen to be 1.460", i.e., only 0.040" smaller in diameter than the ID of the tubing lumen.

So that the same pair of air hose and pilot end caps may be used with a variety of different OD sleeves 801 the ends of sleeve 801 may advantageously be pre-formed to fit the conical space between the end cap and its respective carrot, regardless of the major diameter of sleeve 801. Such pre-forming may advantageously be accomplished by heat the ends such as end 802 of sleeve 801 in a jig (not shown) to the softening temperature, illustratively 600° F. of the PFA material of which the sleeve is made. This temperature lies well above the temperatures employed in welding the thermoplastic tubes A and B. The heated ends of sleeve 801 are then drawn apart to cause the ends of sleeve 801 to neck down and become reduced in diameter to the approximate diameter of carrot 805, 806. The excess length of sleeve 801 may then be trimmed and the reduced diameter ends fitted over the carrots and the end caps made up by tightening screws 807, 826.

Figure 10:
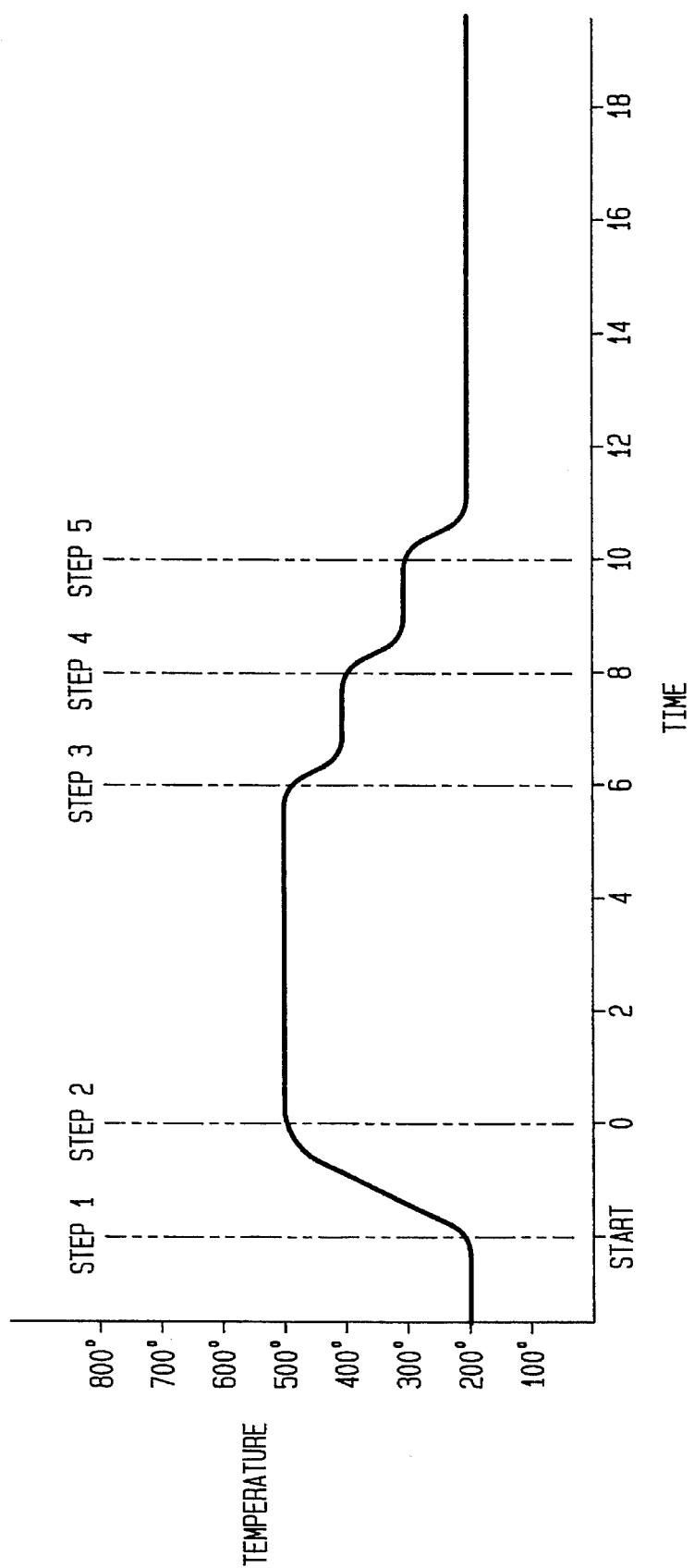
FIG. 10 shows a typical temperature time diagram for the welding unit.

When control unit 20, FIG. 1, energizes electric cable 201, FIG. 2, cartridges 187, 188, 189, 190 heat heater blocks 181 and 182. Heat is transferred to the respective radiator sectors, causing the adjacent central portions of concave surfaces 191S, 192S to apply heat to the outside diameter of tubes 81, 82. Thermocouple 205, FIGS. 2 and 5, measures the temperature of the heater block and sends electrical temperature signals over cable 203 to control unit 20 which regulates the current delivered over cables 201, 202 to heater cartridges 187-190. Responsive to the temperature signals, unit 20 also controls the electrical supply to fan 168. The temperature vs. time diagram for welding tubes of a typical thermoplastic material is shown in FIG. 10. The adjacent ends of tubes 81, 82 expand with the heat supplied by the heater cartridges to heater blocks 181, 182 and convex surfaces 191C, 193C of radiator sectors 191, 193. When heated sufficiently, the ends of tubes 81, 82 become plastic, expand or "grow". However, because tube 82 is firmly held by the latches 241, 242 and tube 81 is held by a similar pair of latches including latch 249 shown in FIG. 9, the expansion of the plastic ends causes tubes 81, 82 to fuse together. Air from fan 168 removes heat from radiator fins 195, 196 to maintain the integrity of tubes 81, 82 immediately outboard of their ends adjacent to the centrally located heater blocks 181, 182.

After the tube ends 81, 82 are suitably heated so that they grow together, control unit 20 removes the current drive to the heater cartridges to discontinue the heating of tubes 81, 82. When sufficiently cooled, a vacuum may be applied to hose 809 to collapse membrane 801 permitting mandrel 30 to be withdrawn from the lumens.

Referring to FIG. 10, a temperature vs. time diagram is shown for welding tubes of a typical thermoplastic material. Because the ambient temperature of the work site at which the welding unit is employed may vary and cause the temperature of the thermoplastic tubing that is to be welded to be indeterminate, the control unit 20, FIG. 1, delays the start of the welding cycle until thermocouple 205, FIGS. 2 and 5, reports that the heater block has reached the initial temperature of 200° F. In this manner thorough heating through the wall thickness of the thermoplastic is obtained so that complete fusion of the tubing ends is assured regardless of ambient conditions. Although the initial temperature of 200° F. is the appropriate beginning point for most types of thermoplastic to be welded, the maximum melt temperature and the annealing temperatures following the maximum melt temperature will vary with the type of thermoplastic. Moreover, in accordance with a further aspect of our invention, two or more reduced temperature steps are employed, such as those illustrated between steps 3 and 4 and between steps 4 and 5, during the annealing and cooling-off to assure that the cooling is gradually conducted.

What has been described is believed to be illustrative of the principles of our invention. Thus, while the preferred embodiment admits the pressurizing air for rigidizing the mandrel directly to the inelastic sleeve, it is also possible to leave one end of the sleeve open to the atmosphere and to apply the pressurizing air to a conventional bladder inside the sleeve. In this alternative arrangement the inelastic sleeve prevents the bladder from coming into contact with the walls of the thermoplastic tubing being welded. However it will not be possible to collapse the sleeve by pulling a vacuum on such a bladder and, accordingly, usage of such an alternative arrangement may be limited to applications where no difficulty in snaking the sleeve through the tubing lumen is anticipated. It will be apparent that further and other modifications may be devised by those skilled in the art without departing from the spirit and scope of our invention.

What is claimed is:

1. Portable apparatus for butt-welding a pair of thermoplastic tubes, comprising:
   a. a hinged heating/cooling chamber for receiving the butt ends of said pair of tubes;
   b. a respective heater block resiliently mounted in each half of said hinged chamber;
   c. a radiator sector insertable into each said heater respective block; said heater block and said radiator sector being coaxially centered about said tubes when inserted into said apparatus, each said radiator sector having a first portion intimately conforming in heat transfer relationship to said heater block and an arcuate portion for embracing the outer periphery of said pair of thermoplastic tubes.

2. Portable butt-welding apparatus according to claim 1 wherein said radiator sectors include a plurality of fins.

3. Portable butt-welding apparatus according to claim 2 wherein said heating/cooling chamber contains an electric fan for drawing cooling air over said fins of said radiator sectors.

4. Portable butt-welding apparatus according to claim 1 further including a dog for grasping the periphery of said tubes as said tubes are being received into said chamber.

5. Portable butt-welding apparatus according to claim 4 wherein said dog is adjustably mounted to frictionally retaining a respective one of said butt ends.

6. Portable butt-welding apparatus according to claim 5 wherein dog includes a spring-loaded claw latch.

7. Portable butt-welding apparatus according to claim 1 including a mandrel insertable in the lumen of said pair of tubes, said mandrel comprising a hollow membrane of flexible, non-elastomeric, heat-resistant material, said membrane having an outer diameter dimensioned to the inner diameter of said tubes.

8. Portable butt-welding apparatus according to claim 7, further including means for pneumatically rigidizing or collapsing said mandrel.

9. Portable butt-welding apparatus according to claim 7, said mandrel further including a pilot end cap, a pneumatic end cap and a flexible link for coupling together said end caps, said pneumatic end cap having passage for pressurizing and evacuating the hollow of said membrane.

10. A mandrel according to claim 9 wherein end caps include nestable first and second tapered conical sections, said membrane being retained between said sections.

11. Portable apparatus for welding thermoplastic tubing while maintaining the integrity of the tubing lumen, comprising:
   a. a hinged heating/cooling chamber for receiving the butt ends of said tubes;

b. a heater block centrally and resiliently mounted in said chamber;

c. a plurality of radiator sectors insertable in said heater block, each of said sectors having
   i. a core portion for intimately conforming to said heater block and
   ii. an arcuate portion for embracing the outer periphery of a respective pair of said plurality of thermoplastic tubes;

d. a cooling fan for drawing cooling air over said radiator sectors;

e. a thermocouple for ascertaining the temperature of said heater block;

f. a rigidizable and collapsible mandrel of inelastic material for insertion in the lumen of said tubes; and g. a control unit for regulating the delivery of current to said heater block in accordance with the temperature ascertained by said thermocouple and for selectively rigidizing and collapsing said mandrel.

12. Portable apparatus for welding according to claim 11 wherein said control unit controls said heater block current to effectuate a melt and anneal cycle.

13. Portable apparatus for welding according to claim 12 wherein said control unit delays the start of said melt and anneal cycle until said thermocouple reports a predetermined temperature.

* * * * *